(No Model.)

H. HOWARD.

BALL BEARING.

No. 456,955. Patented Aug. 4, 1891.

WITNESSES:

Albert L. Bodwell.

James E. Arnold

INVENTOR

Henry Howard

BY

Benj. Arnold

ATTORNEY

THE NORRIS PETERS CO., PHOTO-LITHO., WASHINGTON, D. C.

UNITED STATES PATENT OFFICE.

HENRY HOWARD, OF PROVIDENCE, RHODE ISLAND.

BALL-BEARING.

SPECIFICATION forming part of Letters Patent No. 456,955, dated August 4, 1891.

Application filed November 21, 1890. Serial No. 372,132. (No model.)

*To all whom it may concern:*

Be it known that I, HENRY HOWARD, of Providence, in the county of Providence and State of Rhode Island, have invented certain new and useful Improvements in Ball-Bearings; and I do hereby declare that the following is a full, clear, and exact description thereof, reference being had to the accompanying drawings, and to the letters of reference marked thereon, which form a part of this specification.

This invention relates to the construction and combination of devices connected with the use of balls in bearings for the purpose of lessening the friction and for the greater convenience of handling, both for transportation and in the process of applying them in individual cases, avoiding the serious difficulty found in keeping the several parts together while handling them, and getting them in position in the bearing.

Figure 1:
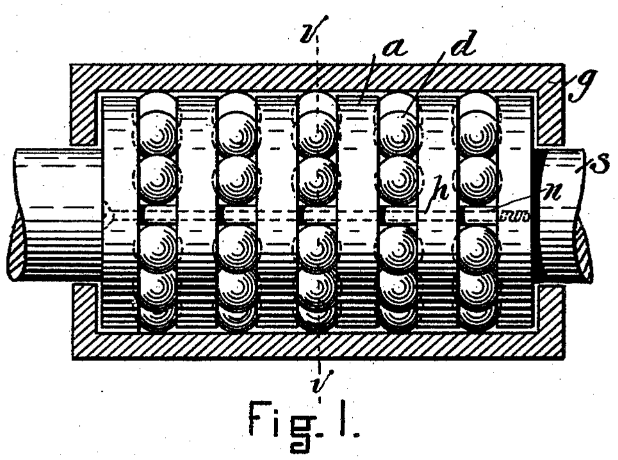
Figure 8:
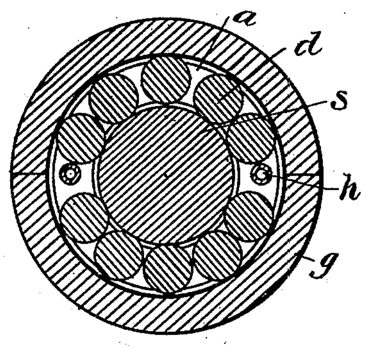
Figure 2:
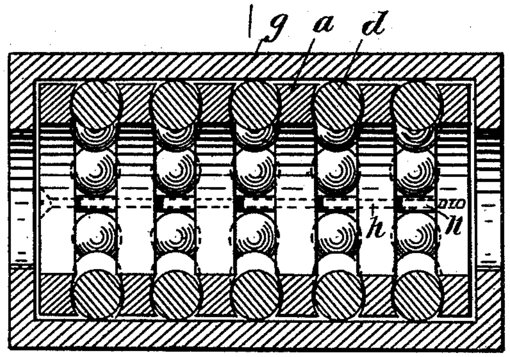
Figure 3:
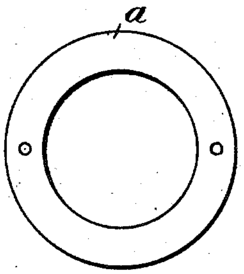
Figure 4:
Figure 5:
Figure 6:
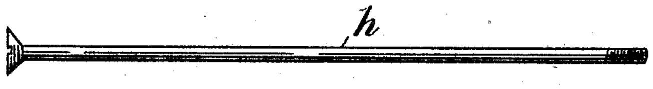
Figure 7:

In the drawings, Figure 1 shows a front elevation of a case of balls confined and ready for use with a part of the bearing and journal, the bearing being in section. Fig. 2 is a vertical longitudinal section of the same through the center of the rings or washers without the shaft. Fig. 3 is a side elevation of one of the rings. Fig. 4 is an edge view of the ring seen in Fig. 3. Fig. 5 is a vertical section through the center of the ring seen in Fig. 4. Fig. 6 is a view of one of the rods for holding the rings and balls in place. Fig. 7 is a perspective view of the sleeve or bolster used to keep the rings apart. Fig. 8 shows a vertical cross-section of the case and bearing seen in Fig. 1 on dotted line *x x*.

The case represented in Fig. 1 for holding the balls consists of a series of rings *a*, placed at a proper distance apart to receive a set of the balls *d* between every two rings. The rings *a* are made concave on their faces or planes square to their axes on both sides, with the exception of the outer faces of the end ones, which may be made flat, so that when two are placed together (see Fig. 2) of the round hollow sides a "groove," as it may be called, is formed, the outer projecting edges of which keep the balls from coming out, and the inner edges in like manner keep the balls from falling in, though at the same time the diameter of the balls being greater than the radial thickness of the rings they will project beyond the outer and inner surfaces of the rings and bear on the surfaces of the bearing *g* and journals.

For the purpose of holding the rings together for convenience in handling and applying in use, as before mentioned, forming a sort of independent case, I use one or more rods *h*, Fig. 6, passing through small holes in the rings and made secure by screwing or otherwise in the end rings or sleeves *n*, (see Fig. 7,) made of short pieces of tube or short metal rolled up, may be put on the rods between the rings to hold them apart, being made of just the right length to hold the rings free of the sides of the balls, so that they can turn freely.

The rings and sleeves, if the latter are used, can all be put on the rods in regular order and the ends of the rods screwed part way into the end rings. Then by pushing the rings all up toward one end the space between the end washer and the second one will be open sufficiently to admit the balls, and when that space is filled the second ring can be pushed down on the balls and the third space can be filled, and so on with all the rings until all the spaces are filled. The screw-rods are then turned in tight, and the case with its balls can be safely handled and transported. The object is to form a case with the balls that can be easily handled and put on the market as an article of manufacture to be disposed of to those who may wish to apply them to bearings on machines they are building or have already in operation.

I claim—

1. As a new article of manufacture, a case or cage with balls for use in a ball-bearing constructed substantially as described—that is, of a series of independent concave-faced rings placed at right angles to the center line of the aperture through them to be occupied by the axle or journal when in use, with rows of balls between the rings, and rods and spacing-sleeves for holding said rings in position, substantially as herein set forth.

2. A roller-bearing cage comprising a series of separate rings having concavities in their faces, rods passing through each of said rings, and balls arranged to project beyond the walls of the rings, substantially as set forth.

3. The combination of two or more concave-faced rings *a*, placed at right angles to the center line of the bearings, rods *p*, spacing-sleeves *n*, and balls *d*, substantially as described.

HENRY HOWARD.

Witnesses:
BENJ. ARNOLD,
HOWARD F. KING.